United States Patent [19]

Shin et al.

[11] Patent Number: 5,582,358
[45] Date of Patent: Dec. 10, 1996

[54] MAGNETIC TAPE CASSETTE WITH A REEL SPRING TO AXIALLY BIAS INTERNAL TAPE REELS

[75] Inventors: Sang-Man Shin; Oh-Shik Kang; Seong-Ho Cho, all of Chungcheongnam-Do, Rep. of Korea

[73] Assignee: SKC Limited, Rep. of Korea

[21] Appl. No.: 329,158

[22] Filed: Oct. 26, 1994

[30] Foreign Application Priority Data

Oct. 27, 1993 [KR] Rep. of Korea .................. 93-22182

[51] Int. Cl.$^6$ ...................... G11B 23/04; G11B 23/087
[52] U.S. Cl. ........................... 242/345.2; 360/132
[58] Field of Search ........................ 242/345.2, 338; 360/132

[56] References Cited

U.S. PATENT DOCUMENTS 4,496,118  1/1985  Oishi et al. .................. 360/132 X
4,781,340  11/1988  Shiba et al. .................. 360/132 X
5,027,249  6/1991  Johnson et al. ................ 242/345.2

FOREIGN PATENT DOCUMENTS 59-186180  10/1984  Japan .................. 242/345.2
4-209381   7/1992   Japan .................. 242/345.2

*Primary Examiner*—John Q. Nguyen
*Attorney, Agent, or Firm*—Finnegan, Henderson, Farabow, Garrett & Dunner, L.L.P.

[57] ABSTRACT

A magnetic tape cassette utilizes a pair of reel pressure springs to stably retain the tape reels therein. The reel pressure springs have a base plate and a plurality of legs each downwardly extending from the perimeter of the base plate to be fitted into a plurality of slits provided on the tape reels, respectively. Further, each slit has a surface profile which enables the legs to resiliently depress the bottom parts of the slits, especially during the running of the tape.

2 Claims, 3 Drawing Sheets

MAGNETIC TAPE CASSETTE WITH A REEL SPRING TO AXIALLY BIAS INTERNAL TAPE REELS

FIELD OF THE INVENTION

The present invention relates to a magnetic tape cassette for use in a tape recorder and; more particularly, to a tape cassette having a pressure spring for the downward biasing of the reels received therein.

DESCRIPTION OF THE PRIOR ART

As is well known, a typical magnetic tape cassette has an upper and a lower cassette casings joined with each other to accommodate therein a pair of magnetic tape reels. The tape reels are designed to come into engagement with drive shafts of a tape recorder so that they may be able to rotate in a "floating" state. To prevent the reels from rotating in an unstable manner and enable the tape to run in a uniform fashion, the tape cassette is generally provided with at least one elastic pressure spring which serves to exert a downward force toward the reels.

U.S. Pat. No. 4,781,340 issued to Haruo Shiba et al. teaches a magnetic tape cassette which includes an elongated plate-shaped pressure spring. The spring has, in its central area, holes through which boss members extend from the upper casing to attach the spring to the upper casing by way of, e. g., welding, heating or the like. This cassette has, however, a disadvantage in that the securing process is significantly complex, which may lead to an increase in the production cost thereof. In addition, there is a possibility that the pressure spring is inadequately attached so that the tape reels cannot be stabilized by the depressing force of the spring.

In U.S. Pat. No. 4,496,118 to Kengo Oishi et al., there is proposed a reel retaining plate spring having protrusions which are fitted into grooves of a cylindrical wall for receiving a photo-sensor. Although the assembly thereof may be done readily, in order to prevent the protrusions from slipping out of the grooves, there is an added requirement that the components should be precisely moulded.

SUMMARY OF THE INVENTION

Accordingly, it is an object of the present invention to provide a magnetic tape cassette which substantially eliminates the drawbacks of the prior art tape cassettes noted above and which is able to rotatably support a pair of reels received therein in a reliable manner.

Another object of the invention is to provide an improved pressure spring which can be physically installed in the tape cassette by a simple work and which can be manufactured at a reduced cost.

In accordance with the invention, there is provided a magnetic tape cassette comprising: a housing; a pair of tape reels received in the housing, each being vertically movable between a first and a second positions thereof; a pair of reel pressure springs each having a base plate, a plurality of legs vertically extending from the perimeter of the base plate and a lug protruding from a substantially central position of the base plate in a direction opposite that of the legs; means formed in the tape reels for receiving the legs of the pressure springs; and means for allowing the base plates of the pressure springs to move in relation to the tape reels when the tape reels move between the first and the second positions.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
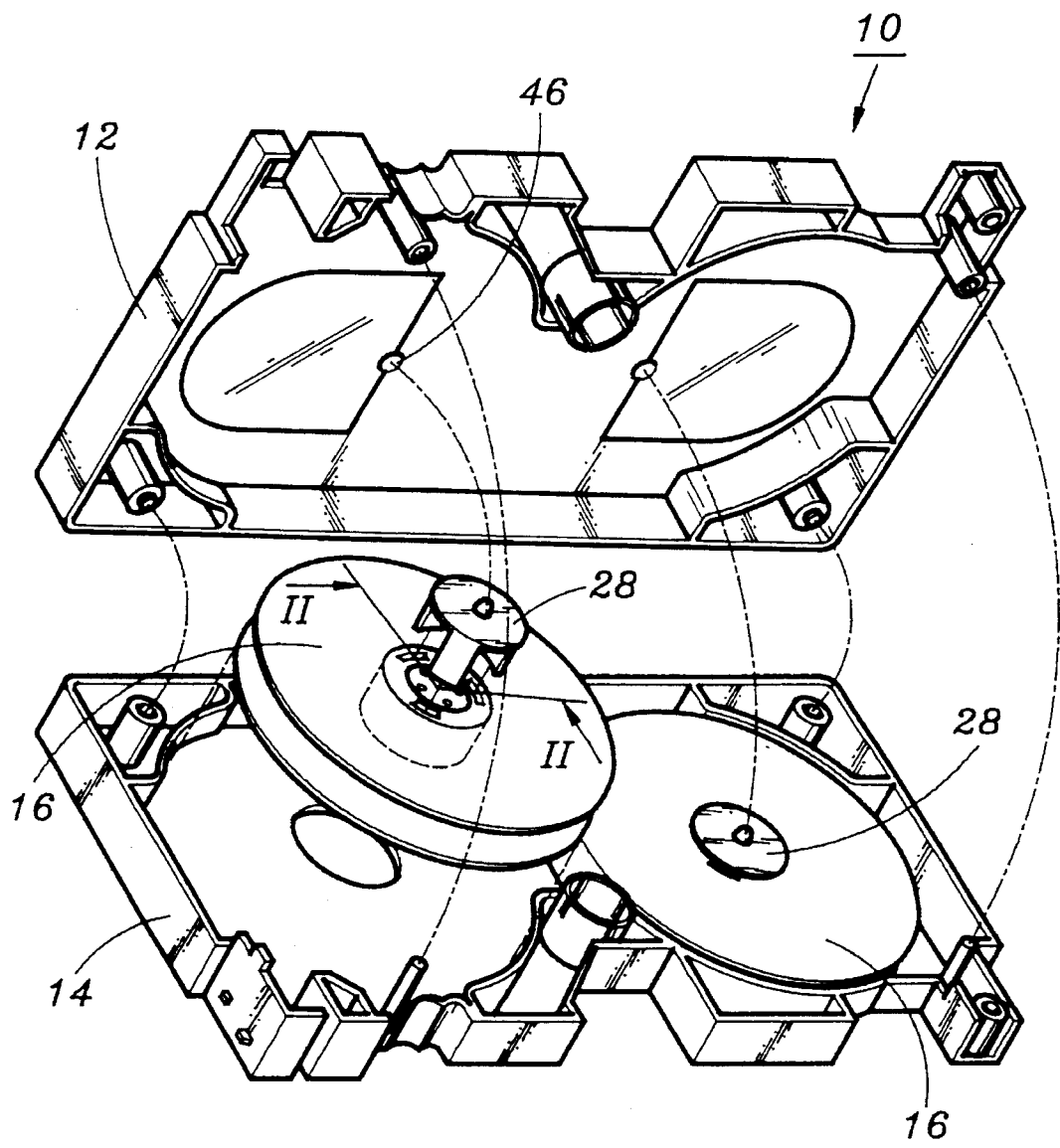
FIG. 1 is an exploded perspective view illustrating a videotape cassette in accordance with a first embodiment of the present invention, which incorporates a pair of tape reels and a pair of reel pressure springs fitted thereinto.

Referring to FIG. 1, there is shown a first embodiment of a videotape cassette of the instant invention, generally designated by reference numeral 10, which is intended for use in a video cassette recorder(VCR). As shown, the videotape cassette 10 comprises an upper and a lower cassette casings 12, 14 that are combined together to form a housing or cartridge.

Figure 2:
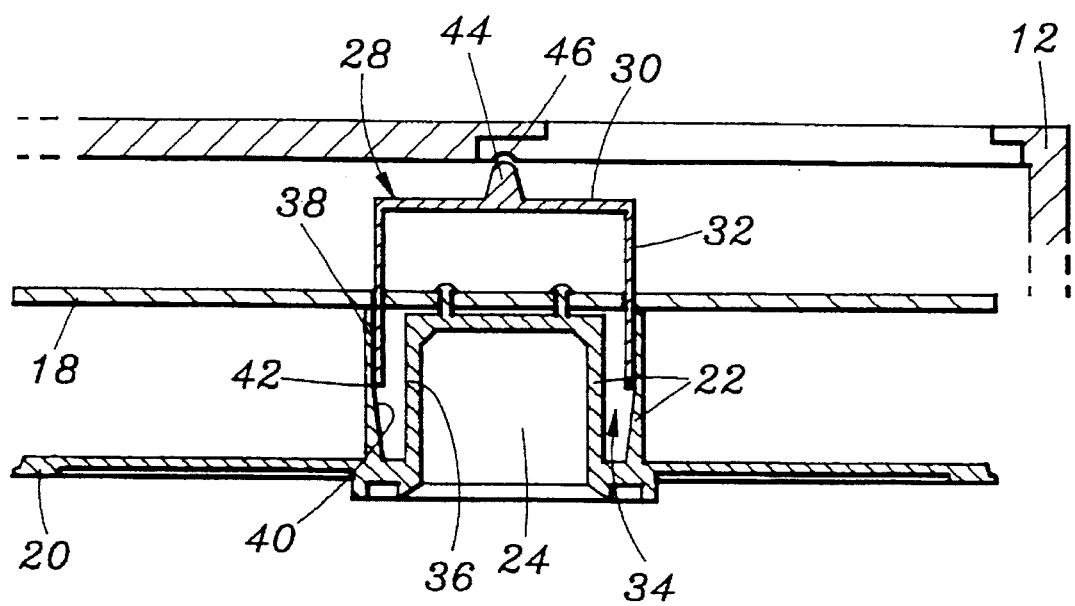
FIG. 2 is a cross-sectional view taken along line II—II of FIG. 1, but showing the cassette assembled, with the tape reels lying in their lowered position.
Figure 3:
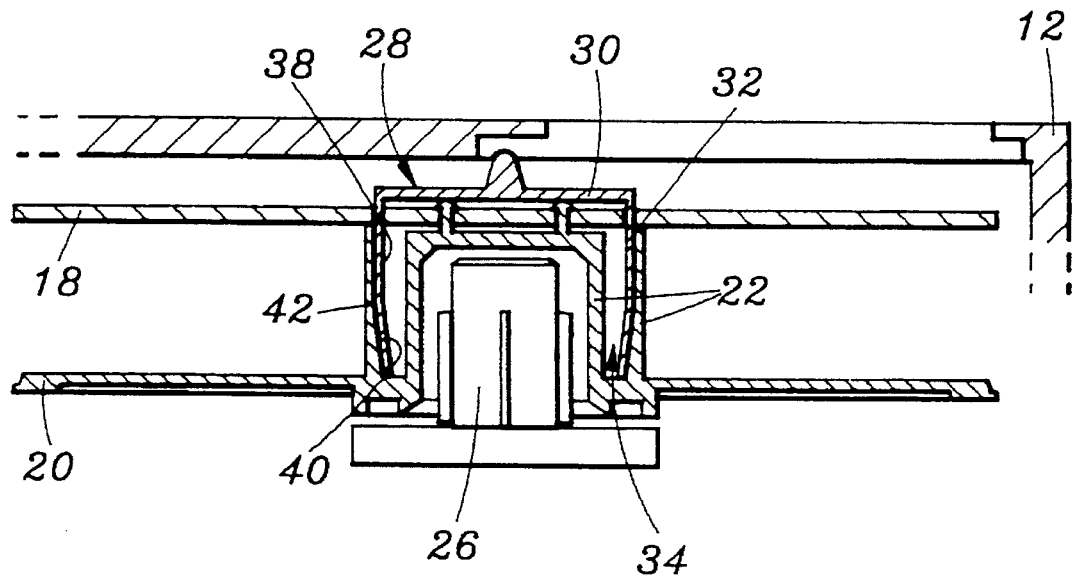
FIG. 3 is a view similar to FIG. 2, except for the tape reels lying in their raised position.

Contained in the cassette housing is a pair of rotatable reels 16 carrying a length of videotape(not shown) wound therearound. As shown in FIGS. 2 and 3 together, each of the reels 16 is provided with a pair of coextensive flanges 18, 20 that remain spaced apart by a cylindrical hub 22. In the bottom of the hub 22, there is provided a hole 24 which is designed to mate with each drive shaft 26 upwardly extending from the VCR as shown in FIG. 3 to lift the tape reels from a lowered position to a raised "floating" position, thereby minimizing the friction between the reels 16 and a bottom panel of the lower casing 14.

Referring now to FIG. 1, accommodated in the cassette housing is also a pair of reel pressure springs, generally designated by reference numeral 28, which may be made of a metal or plastic material. As clearly shown in FIGS. 2 and 3, each pressure spring 28 includes a circular base plate 30 interposed between a top panel of the upper casing 12 and the tape reels 16. In order to have the pressure springs 28 affixed to the reels 16, a plurality of legs 32 is provided to downwardly extend from the perimeter of the base plate 30 and be fitted into a plurality of arc-shaped slits or grooves 34 disposed on the top faces of the tape reels 16.

As will be apparent from FIGS. 2 and 3, the slits 34 have a vertically extending inner surface 36 and a vertically extending upper and a radially inwardly inclined lower outer surfaces 38, 40 joined together via a transition 42, respectively. The inclined outer surfaces 40 serve to guide the legs 32 therealong in a vertical movement of the tape reels 16. The free ends of the legs 32 can rest at the transition 42 when the tape reels 16 maintain to be located in their lowered position; while capable of resiliently depressing the bottom of the slits 34 when the tape reels 16 are placed in their raised position.

A lug 44 upwardly projects from a substantially central location of each base plate 30 to support the top panel of the upper casing 12, in particular, in the raised position. The top panel preferably have a pair of recesses 46 in which lugs 44 are seated at the raised position. It will be apparent to those skilled in the art that the lugs 44 are used to minimize or eliminate frictional engagement of the base plates 30 of the springs 28 with the upper casing 12 when the tape is running.

It should be noted that the reel pressure springs 28 can be installed in the cassette housing merely by inserting the legs 32 of the springs 28 into the slits 34 of the reels 16, thereby saving the time of manufacturing the cassette 10.

With the construction of the videotape cassette 10, if the tape reels 16 are in their lowered position, the free ends of the legs 32 will remain to be positioned at the transitions 42 of the slits 34 as discussed hereinbefore. Under that condition, a space will be provided between the base plates 30 and the top faces of the tape reels 16, respectively. As the tape reels 16 ascend to their raised position by way of, for example, the insertion of the drive shafts 26 of the VCR into the holes 24 of the reels 16, the free ends of the legs 32 slide along the inclined outer surface 40 toward the bottoms of the slits 34 until the base plates 30 mate with the top faces. Therefore, the raised position of the tape reels 16 makes it possible to enable the pressure spring 28 to resiliently depress the tape reels 16 toward the lower casing 14.

Figure 4:
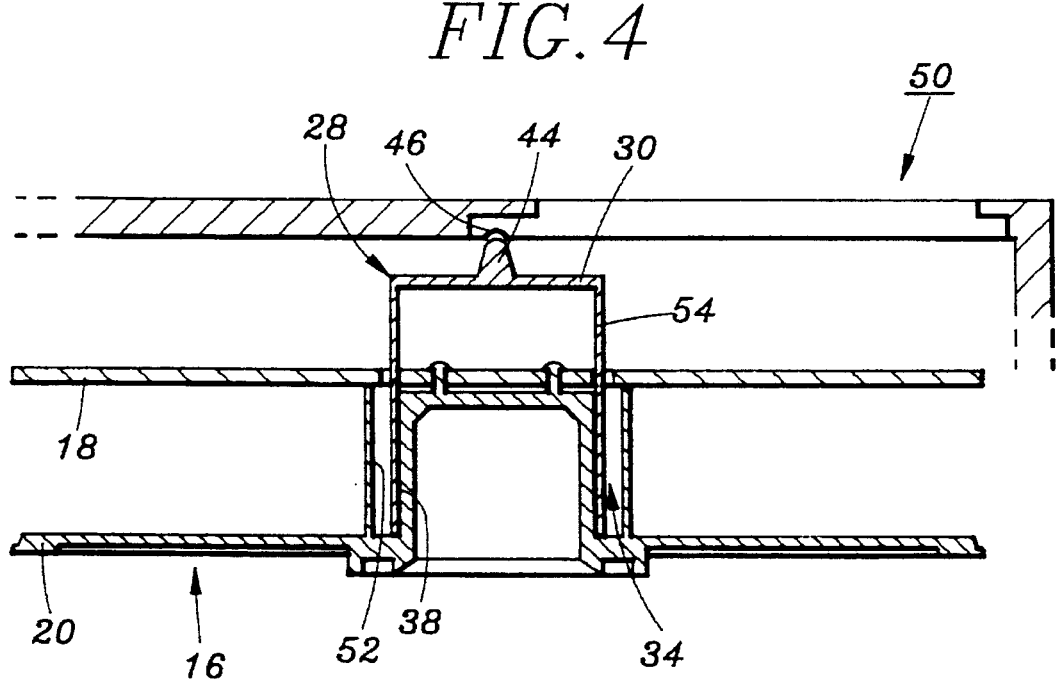
FIGS. 4 and 5 are views corresponding to FIGS. 2 and 3, respectively, showing a videotape cassette made in accordance with a second embodiment of the present invention.
Figure 5:
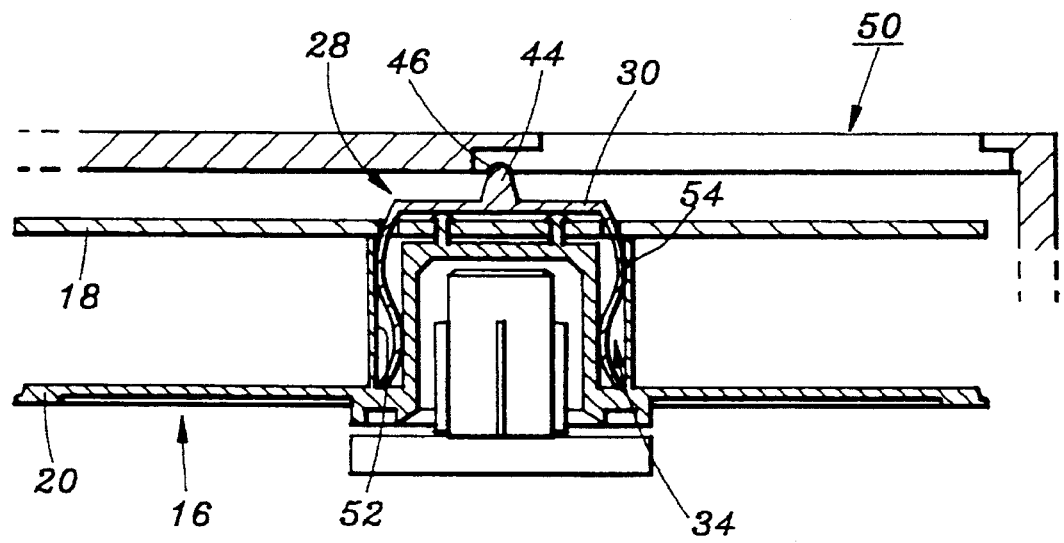

Referring now to FIGS. 4 and 5, there is shown a videotape cassette 50 made in accordance with a second embodiment of the present invention. In this embodiment, it should be noted that like reference numerals used in the first embodiment denote like elements. The tape cassette 50 is similar to the above noted tape cassette 10, but with an outer surface 52 of the slit 34 linearly extending over the length thereof in parallel to the vertical inner surface 36, and legs 54 having a length longer than the depth of the slits 34. The structure permits the base plate 30 of the spring 28 to be kept apart from the top face of the reel hub 22 by the legs 54 in the lowered position of the reels 16 as shown in FIG. 4. On the other hand, in the raised position of the reels 16 as shown in FIG. 5, the legs 54 will smoothly bend in a manner that the base plates 30 move toward the top face of the reels 16. It will be apparent to those skilled in the art that the slits 34 have a substantially wider width than that of the legs 54 so as to permit such a bending.

Although the invention has been shown and described with respect to the exemplary embodiments thereof, it should be understood by those skilled in the art that various changes, modifications and/or additions may be made without departing from the spirit and scope of the invention as defined in the following claims.

What is claimed is:

1. A magnetic tape cassette comprising:

a housing, including a top, a bottom, and sides;

a pair of tape reels received in the housing for carrying a length of tape wound therearound, the reels having respective axes of rotation extending vertically relative to the housing, each reel being vertically movable relative to the bottom of the housing between a first and a second position thereof;

a pair of reel springs, one spring for each reel, for biasing the tape reels in a direction opposite the top of the housing, each of the reel springs having a base plate, a plurality of legs axially extending from a perimeter of the base plate and a lug protruding from a substantially central location of the base plate in a direction opposite that of the legs;

a plurality of arc-shaped slits formed in the tape reels for receiving the legs of the reel springs, each slit being defined by a pair of opposed, radially-spaced surfaces axially extending to a bottom of the slit, the radially outward surface of each pair of surfaces being disposed for sliding engagement with the corresponding leg and having a radially inwardly inclined section extending toward the bottom of each slit over a limited length thereof; and each leg having an axial length such that when the corresponding base plate mates an axial end of the corresponding reel the distal end of the leg is resiliently deflected inwardly by the corresponding inclined section without abutting against the bottom of the respective slit.

2. The magnetic tape cassette as recited in claim 1, wherein said housing includes a pair of recesses on the top of the cassette, in which the lugs of the springs may be seated.

* * * * *